(12) United States Patent
Austin et al.

(10) Patent No.: US 6,590,303 B1
(45) Date of Patent: Jul. 8, 2003

(54) SINGLE BUTTON MP3 PLAYER

(75) Inventors: Micheal M. Austin, Lilburn, GA (US); Kevin K. Maggert, Lilburn, GA (US); Lori D. Perry, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 67 days.

(21) Appl. No.: 09/697,373

(22) Filed: Oct. 26, 2000

(51) Int. Cl.⁷ .............................................. H01H 35/00
(52) U.S. Cl. .................. 307/119; 307/134; 340/825.24; 200/518
(58) Field of Search ................................ 307/126, 134, 307/139, 143, 119; 340/825.24, 825.69; 200/51.03, 51.05, 51.15, 341, 518, 520, 531

(56) References Cited

U.S. PATENT DOCUMENTS

| | | | |
|---|---|---|---|
| 5,450,525 A | * | 9/1995 | Russell et al. ............... 704/275 |
| 5,544,063 A | * | 8/1996 | Zanders et al. ............... 702/65 |
| 5,786,819 A | * | 7/1998 | Weiser et al. ............... 345/810 |
| 6,046,684 A | * | 4/2000 | Hamersley et al. .... 340/825.69 |
| 6,252,379 B1 | | 6/2001 | Fischl et al. |
| 6,255,805 B1 | | 7/2001 | Papalia et al. |
| 6,292,440 B1 | * | 9/2001 | Lee ............................ 369/7 |
| 6,296,600 B1 | | 10/2001 | Drummond et al. |
| 6,307,758 B1 | | 10/2001 | Geren |
| 6,316,956 B1 | | 11/2001 | Oglesbee |
| 6,342,776 B1 | | 1/2002 | Taylor et al. |
| 6,344,727 B1 | | 2/2002 | Desai et al. |
| 6,349,212 B1 | * | 2/2002 | Martensson et al. ........ 455/462 |
| 6,356,054 B1 | | 3/2002 | Herrmann |
| 6,388,449 B1 | | 5/2002 | Ramsden |
| 6,388,524 B1 | | 5/2002 | Anderson, Jr. et al. |
| 6,392,382 B1 | | 5/2002 | Faerber et al. |
| 6,394,826 B1 | | 5/2002 | Baxter et al. |
| 6,396,726 B1 | | 5/2002 | Austin et al. |
| 6,400,557 B1 | | 6/2002 | Watson et al. |
| 6,400,587 B1 | | 6/2002 | Geren et al. |

OTHER PUBLICATIONS

Motorola Press Release, Allison Kirstein, Motorola Debuts Affordable, Easy–To–Use Renegade—The One–Button Entry Level Pager, Jan. 6, 1995.*
Nokia Press Release, Megan Matthews, Nokia presents new products at CTIA Wireless '99. Feb. 8, 1999.*
Lawrence J. Magid, The Cutting Edge: Focus on Technology; Custom Universal Remote Cuts the Clutter but Not the Complication, May 29, 2000, The Los Angeles Times; C. 3.*
Don Loose, Customizing Makes Ultimate Remote Control, Jun. 25, 2000, Dayton Daily News, 3L.*
www.nokiausa.com/phones/series/51706/1,5258,,00.html.
US Appl. No. 10/003,153, filed Nov. 2, 2001.

* cited by examiner

Primary Examiner—Brian Sircus
Assistant Examiner—Sharon A. Polk
(74) Attorney, Agent, or Firm—Philip H. Burrus, IV

(57) ABSTRACT

This invention includes an electronic accessory having a single button that actuates all of its control features. In one embodiment, the accessory is a MP3 player wherein songs are stored on a multimedia card. Once the card has been loaded an inserted, the MP3 player is coupled to an energy source. In a preferred embodiment, the energy source is preferably a cellular telephone. After coupling, all of the functions of the MP3 player are controlled with a single button. In a preferred embodiment, power is actuated by pushing the button for one second. Volume is adjusted by toggling the button laterally. Tracks are selected by pushing the button quickly while power is applied. Power is turned off by depressing the button for two seconds or more.

14 Claims, 2 Drawing Sheets

SINGLE BUTTON MP3 PLAYER

TECHNICAL FIELD

This invention relates generally to audio players, and more specifically to portable MP3 players.

BACKGROUND

There is a trend in the electronic accessories business to converge devices. For example, cellular telephones are converging with personal data assistants (PDAs), MPEG-1 Audio Layer 3 (MP3) players, and the like. When electronic devices converge, however, the device can become complicated to operate. A primary example is a universal remote control. It is not uncommon to have a universal remote control with 50 or more buttons.

While there are many portable MP3 players on the market, including those manufactured by Sony, Philips, and Audiovox, an extensive search of over 70 MP3 players on the market reveals that the typical MP3 player has five buttons or more. These buttons include volume, power, track select and the like. This large number of buttons makes it difficult to merge MP3 players with cellular telephones without increasing complexity and cost. There is thus a need for a simplified MP3 player.

DETAILED DESCRIPTION OF THE INVENTION

Figure 1:
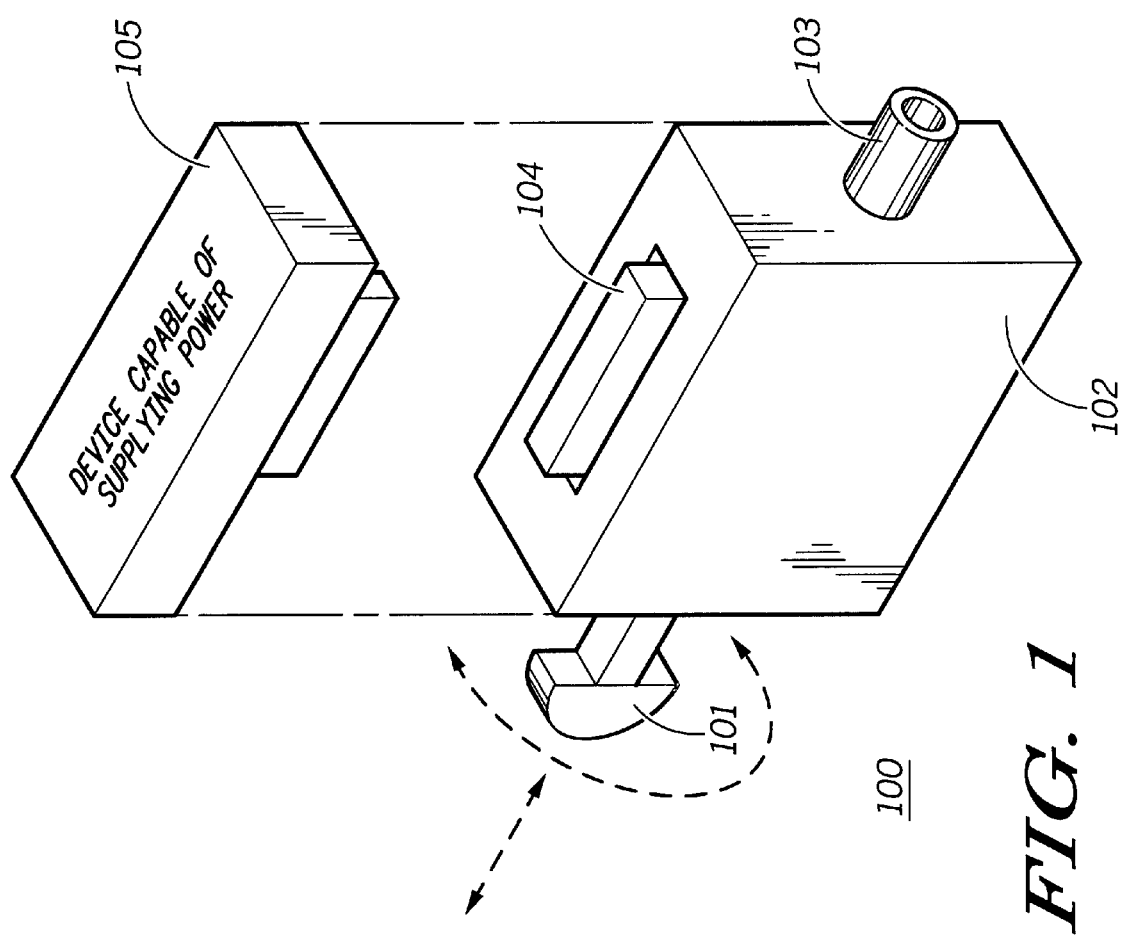
FIG. 1 illustrates a preferred embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention includes an MP3 accessory with single button control. In a preferred embodiment, a single, multi-action switch is employed to control all functions of the MP3 player. The switch is capable of being toggled to the left or right, as well as offering a push button action. The combination of these three motions, left, right and push, allow the user to power up the MP3 player, adjust volume, select the track, and power down the device with a single switch. The advantages of the invention include reduced MP3 player size due to the lack of multiple controls, one finger operation, and reduced cost.

In accordance with this invention, songs are downloaded onto a MultiMedia Card (MMC) having flash—or equivalent—non-volatile memory. Such cards include the SDMB-16-470 MMC card manufactured by Sandisk. The cards are loaded with data via an MP3 ripper—or equivalent—in a computer that is coupled to any of the various off the shelf MMC downloaders. Once the songs are loaded, the card is inserted into a slot in the MP3 player.

Referring now to FIG. 1, illustrated therein is an MP3 player 100 in accordance with the invention. The MP3 player 100 includes an outer housing 102, an audio jack 103 and an accessory connector 104. In one embodiment, the accessory connector 104 is intended for coupling to a like connector on a cellular phone. In this fashion, the MP3 player 100 can employ the battery attached to the phone. It is clear to those skilled in the art that the invention is not so limited. The MP3 player 100 could equally be coupled to any device capable of supplying power, including a two-way radio, a pager, a personal data assistant (PDA), a power supply or a battery.

The MP3 player 100 includes a slot for an MMC card (not shown). Once the MMC card containing MP3 music or other data has been inserted and the MP3 player 100 has been coupled to a power source, the user may control the MP3 player 100 with the single button 101. In an exemplary embodiment, power is turned on by pushing the button in for 1 second or longer. Once the MP3 player 100 is powered up, volume can be controlled by rotating the single button 104 to the left or right, which corresponds to increasing and lowering the volume. A quick press (on the order of less than half a second) causes the track to toggle, thereby advancing the MP3 player 100 to the next song. The MP3 player 100 can then be turned off by pushing the button in for over 2 seconds.

Figure 2:
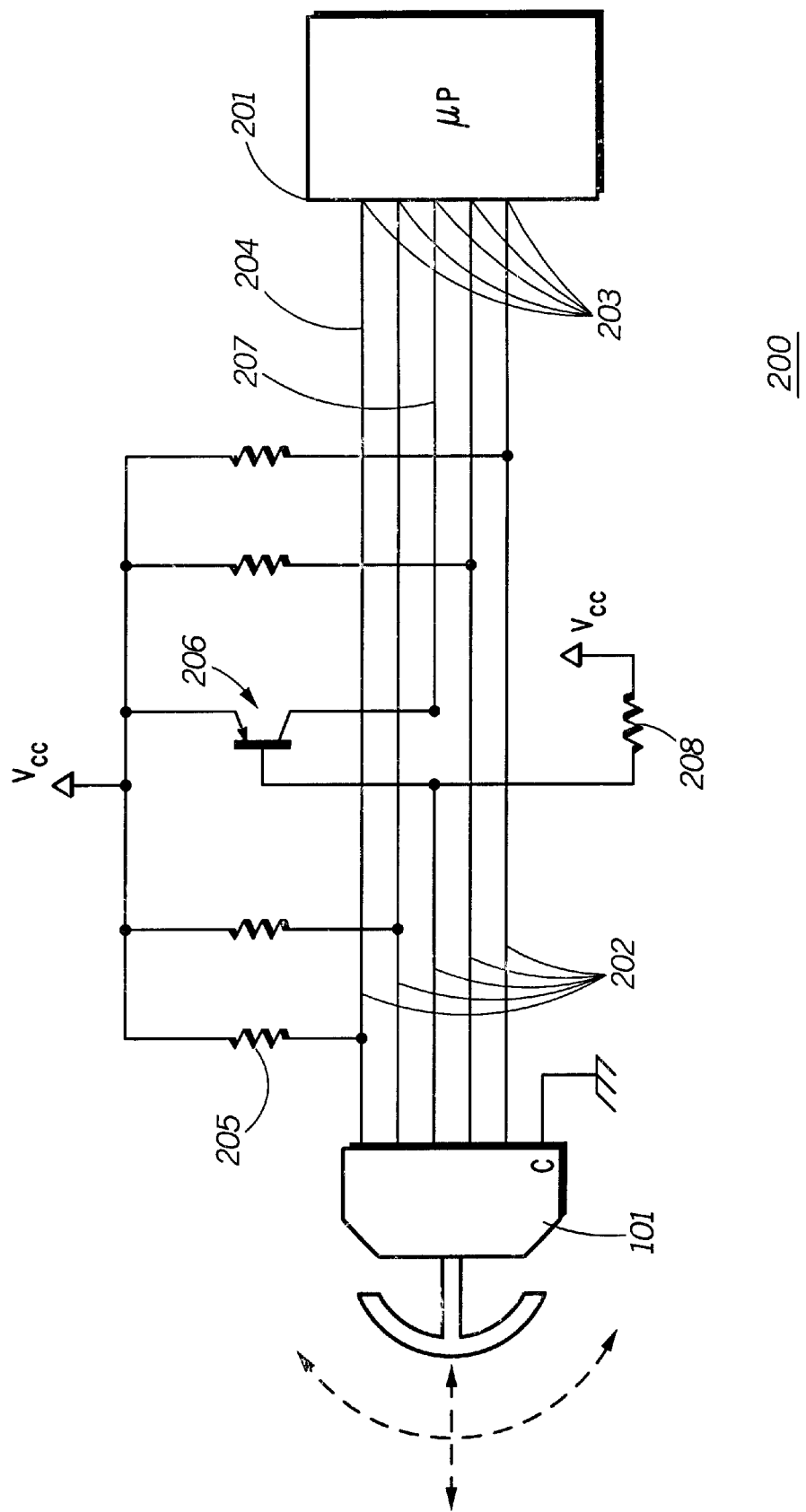
FIG. 2 illustrates a schematic diagram of a switch circuit in accordance with the invention.

Referring now to FIG. 2, illustrated therein is an exemplary circuit 200 for enabling the single button operation. The circuit 200 includes the single button 101 which is a triple action switch having three modes of operation. In one exemplary embodiment, a SPPA967 JogDial™ switch manufactured by Sony was employed. This switch has six outputs 202 corresponding to the various activation states. Each of these outputs 202 is then coupled to digital inputs 203 of a microprocessor 201, IC controller, or programmable logic unit. Such microprocessors include the TS83C51 processor manufactured by Temic.

The single button 101 can toggle the inputs 203 of the microprocessor 201 in many different ways. First, when the single button is inactive, the single button provides an electrically continuous connection from the digital inputs 203 to ground. In this state, the microprocessor 201 reads the inputs 203 as active low. When the single button is toggled in one of the three manners previously described, one of the continuous paths to ground will be broken. Assume that pushing in the single switch 101 causes the first signal line 204 no longer to be pulled to ground. When this occurs, a "pull up" resistor 205 causes the high impedance first signal line to go active high. Thus, the microprocessor 201 knows that the single button 101 has been pushed. It is clear to those skilled in the art that a high-to-low transition can be achieved by employing the corollary, or closing a switch to ground with the single button 101 is actuated.

An alternative method of signaling the microprocessor 201 involves a transistor 206. In this exemplary embodiment, the base of the transistor 206 is pulled low when the single button 101 is inactive As the transistor 206 is a P-channel device, the low base causes the transistor 206 to be on, causing the third input 207 to be active high. When the continuous path to ground is broken by toggling the single button 101, a pull-up resistor 208 causes the base to go high, thereby causing the third signal line to go to a high impedance state. The microprocessor 201 thus knows that the single button 101 has been toggled.

As the microprocessor 201 executes an embedded firmware program stored in a memory (not shown), the firmware algorithm may start an internal counter or timer when one of the inputs 203 changes states. By calculating the time that the input 203 was in the actuated state, the microprocessor may associate different control functions with different lengths of time of actuation. Extending this principle, a very large number of features could be integrated in to the single button, which each represented by a different length of single button 101 actuation.

Alternate embodiments of single button include a rotational switch, wherein complete revolutions would advance the track, while fractional revolutions would adjust the volume. Another embodiment would be a watch stem type switch, where turning the knob would advance the track, and pulling the stem out a fraction of an inch would adjust the volume.

While the preferred embodiments of the invention have been illustrated and described, it is clear that the invention is not so limited Numerous modifications, changes, variations, substitutions, and equivalents will occur to those skilled in the art without departing from the spirit and scope of the present invention as defined by the following claims. For example, while the invention bas been described as being directed towards MP3 players, the invention could likewise be employed with radios, televisions, two way radios and the like.

What is claimed is:

1. An electronic accessory comprising:
   a. at least one aural output with variable volume;
   b. at least one power input;
   c. a plurality of data sources; and
   d. one button, wherein the one button has at least two actuation modes, wherein a first actuation mode comprises depressing the button, and wherein a second actuation mode comprises toggling the button laterally; wherein the one button controls at least:
      i. adjustment of the variable volume;
      ii. actuation of the at least one power input; and
      iii. selection of one of the plurality of data sources.

2. The accessory of claim 1, wherein the accessory is selected from the group consisting of MP3 players, radios, televisions, cellular telephones, audio cassette players, mini-disc recorders, digital audio tape players, electronic media players and compact disc players.

3. The accessory of claim 2, wherein the at least one power input to the accessory is activated by depressing the button for a first predetermined amount of time.

4. The accessory of claim 3, wherein the variable volume is adjusted by toggling the button laterally.

5. The accessory of claim 4, wherein the at least one power input to the accessory is deactivated by depressing the button for a second predetermined amount of time.

6. The accessory of claim 5, wherein the selection of one of the plurality of data sources is performed by depressing the button for a time less than the second predetermined amount of time.

7. The accessory of claim 6, further comprising an audio jack.

8. The accessory of claim 7, further comprising a mating connector for coupling to a power source.

9. The accessory of claim 8, wherein the power source is selected from the group consisting of cellular telephones, pagers, radios, power supplies, and batteries.

10. The accessory of claim 9, further comprising a connector for coupling to a multi-media card.

11. A method of controlling an electronic accessory, the method comprising the steps of:
    a. Providing an electronic accessory having a single button;
    b. Providing a power source;
    c. Coupling the electronic accessory to the power source;
    d. Actuating power by depressing the single button for a first predetermined amount of time;
    e. Adjusting the volume level by toggling the single button laterally; and
    f. Deactivating power by depressing the single button for a second predetermined amount of time.

12. The method of claim 11, wherein the electronic accessory is selected from the group consisting of MP3 players, radios, televisions, cellular telephones, audio cassette players, mini-disc recorders, digital audio tape players, electronic media players and compact disc players.

13. The method of claim 12, wherein the accessory is an MP3 player.

14. The method of claim 13, further comprising the step of selecting a track by depressing the single button for a time less than the second predetermined time while power is actuated.

* * * * *